US006980425B2

(12) United States Patent
Chuang et al.

(10) Patent No.: US 6,980,425 B2
(45) Date of Patent: Dec. 27, 2005

(54) ROTATABLE DISPLAY MOUNTING ARRANGEMENT

(75) Inventors: Chin-Ku Chuang, Taipei (TW); Wen-Chieh Wang, Taipei (TW); Chao-Ming Huang, Taipei (TW)

(73) Assignee: Tatung Co., Ltd., Taipei (TW)

(*) Notice: Subject to any disclaimer, the term of this patent is extended or adjusted under 35 U.S.C. 154(b) by 3 days.

(21) Appl. No.: 10/778,161

(22) Filed: Feb. 17, 2004

(65) Prior Publication Data

US 2005/0128690 A1 Jun. 16, 2005

(30) Foreign Application Priority Data

Dec. 10, 2003 (TW) .............................. 92221696 U

(51) Int. Cl.[7] ................................................ G06F 1/16
(52) U.S. Cl. .............................. 361/683; 343/700 MS; 16/367; 248/917
(58) Field of Search ................................ 361/680–687, 361/724–727; 16/367; 343/700 MS, 702, 343/770, 730; 364/708.1

(56) References Cited

U.S. PATENT DOCUMENTS

| 6,636,181 B2 * | 10/2003 | Asano et al. ............... 343/702 |
| 2003/0167601 A1 * | 9/2003 | Chen ............................ 16/367 |
| 2005/0063145 A1 * | 3/2005 | Homer et al. ............... 361/683 |

\* cited by examiner

*Primary Examiner*—Hung Van Duong
(74) *Attorney, Agent, or Firm*—Bacon & Thomas PLLC

(57) ABSTRACT

A rotatable display mounting arrangement is disclosed to include a base having a first pivot structure, an open frame, the open frame having a second pivot structure pivotally coupled to the first pivot structure of the base and a second pivoting means symmetrically disposed at top and bottom frame bars thereof, and a display horizontally rotatably mounted within the open frame, the display having a first pivoting means symmetrically disposed at the top and bottom sides and respectively pivoted to the second pivoting means of the open frame, the first pivoting means having wire holes for the passing of the electric circuit wire of an antenna embedded in the top frame bar of the open frame and the electric circuit wire of the base to the display.

6 Claims, 6 Drawing Sheets

ROTATABLE DISPLAY MOUNTING ARRANGEMENT

BACKGROUND OF THE INVENTION

1. Field of the Invention

The present invention relates to a display mounting arrangement and, more particularly, to a rotary display mounting arrangement used in a dual-usage portable computer.

2. Description of Related Art

A regular dual-usage portable computer generally comprises a base and a display. The base comprises a keyboard. The display is rotatable relative to the base. When covered the display on the base (display screen upward, as FIG. 6), this dual-usage portable computer is used as a tablet PC. When opened the display from the base, this dual-usage portable computer is used as a notebook computer. Therefore, this kind of portable computer is called the dual-usage type.

In order to achieve the object of the aforesaid dual-usage, various rotatable display mounting designs have been developed. FIG. 1 shows a rotatable display mounting structure according to the prior art. As illustrated, an open frame 92 is fastened pivotally with a base 93, and a display 91 is pivotally mounted within the open frame 92. The open frame 92 can be rotated relative to the base 93 and then closed on the base 93. The display 91 can be rotated about a horizontal axis within the open frame 92 (see the direction of rotation as indicated by the arrow sign in FIG. 1). When the display screen 911 of the display 91 faces the base 93 after the open frame 92 has been lifted from the base 93, the portable computer is used as a notebook computer. On the contrary, when reversed the display screen 911 of the display 91 relative to the base 93 and closely attached with the open frame 92 to the top face of the base 93, the portable computer is used as a tablet PC.

However, because the pivoting means between the display 91 and the open frame 92 is disposed at two opposite lateral sides, the internal electric wire 94 of the base 93 or display 91 must be arranged inside the two side bars 921 of the open frame 92. This electric wire design is complicated. Because the two side bars 921 must be made in a hollow design to accommodate the electric wire 94, the structural strength of the side bars 921 is weak, affecting the structural strength of the whole open frame 92, i.e., the side bars 921 of the open frame 92 tends to break due to downward pressure from the suspended display 91. U.S. Pat. No. 5,410,447 is an example of this design.

Therefore, it is desirable to provide a rotatable display mounting arrangement that eliminates the aforesaid drawbacks.

SUMMARY OF THE INVENTION

The present invention has been accomplished under the circumstances in view. It is the main object of the present invention to provide a rotatable display mounting arrangement, which reinforces the structural strength of the frame for rotary display, and facilitates the arrangement of electric wires.

To achieve this and other objects of the present invention, the rotatable display mounting arrangement comprises a base, an open frame, and a display. The base comprises a top face, four upright peripheral walls, and a first pivot structure disposed at a top side of one of the upright peripheral walls. The open frame comprises a left-side frame bar, a right-side frame bar, a top frame bar, a bottom frame bar, a mounting space surrounded by the left-side frame bar, the right-side frame bar, the top frame bar and the bottom frame bar, a second pivot structure disposed at an outer side of the bottom frame bar and pivoted to the first pivot structure for enabling the open frame to be rotated relative to the base and closed on the top face of the base, and a second pivoting means symmetrically disposed on the middle position of each of the top frame bar and the bottom frame bar. The display is mounted within the mounting space inside the open frame, comprising a left side, a right side, a top side and a bottom side respectively disposed corresponding to the left-side frame bar, right-side frame bar, top frame bar and bottom frame bar of the open frame, and a first pivoting means symmetrically disposed on the middle position of each of the top side and the bottom side and pivoted to the second pivoting means for enabling the display to be rotated left and right within the mounting space of the open frame. The invention is characterized in that one of the first pivoting means and the second pivoting means is comprised of two axially aligned pivot holes, and the other of the first pivoting means and the second pivoting means is comprised of two axially aligned pivot rods respectively pivoted to the pivot holes. The pivot rods are tubular each defining an axially extended wire hole.

As indicated, the first pivoting means are respectively disposed at the top and bottom sides of the display, and the second pivoting means are respectively provided at the top and bottom frame bars of the open frame and adapted to pivot with the first pivoting means for enabling the display to be rotated left and right and supported within the open frame. Therefore, the top and bottom frame bars of the open frame support the weight of the display, and the display simply gives a downward pressure to the open frame without causing a twisting force to the left-side and right-side frame bars of the open frame. Therefore, this design improves the structural strength of the open frame. Further, because one of the first pivoting means and the second pivoting means is comprised of two axially aligned pivot rods which are tubular each defining an axially extended wire hole, the electric wire of an embedded antenna at the top frame bar of the open frame and the electric wire of the base can be extended through the wire holes of the pivot rods of one of the first pivoting means and second pivoting means, and then respectively connected to the internal circuit of the display without passing through the left-side and right-side frame bars of the open frame. Therefore, the invention eliminates the drawbacks of the aforesaid prior art design.

DETAILED DESCRIPTION OF THE PREFERRED EMBODIMENT

Figure 1:
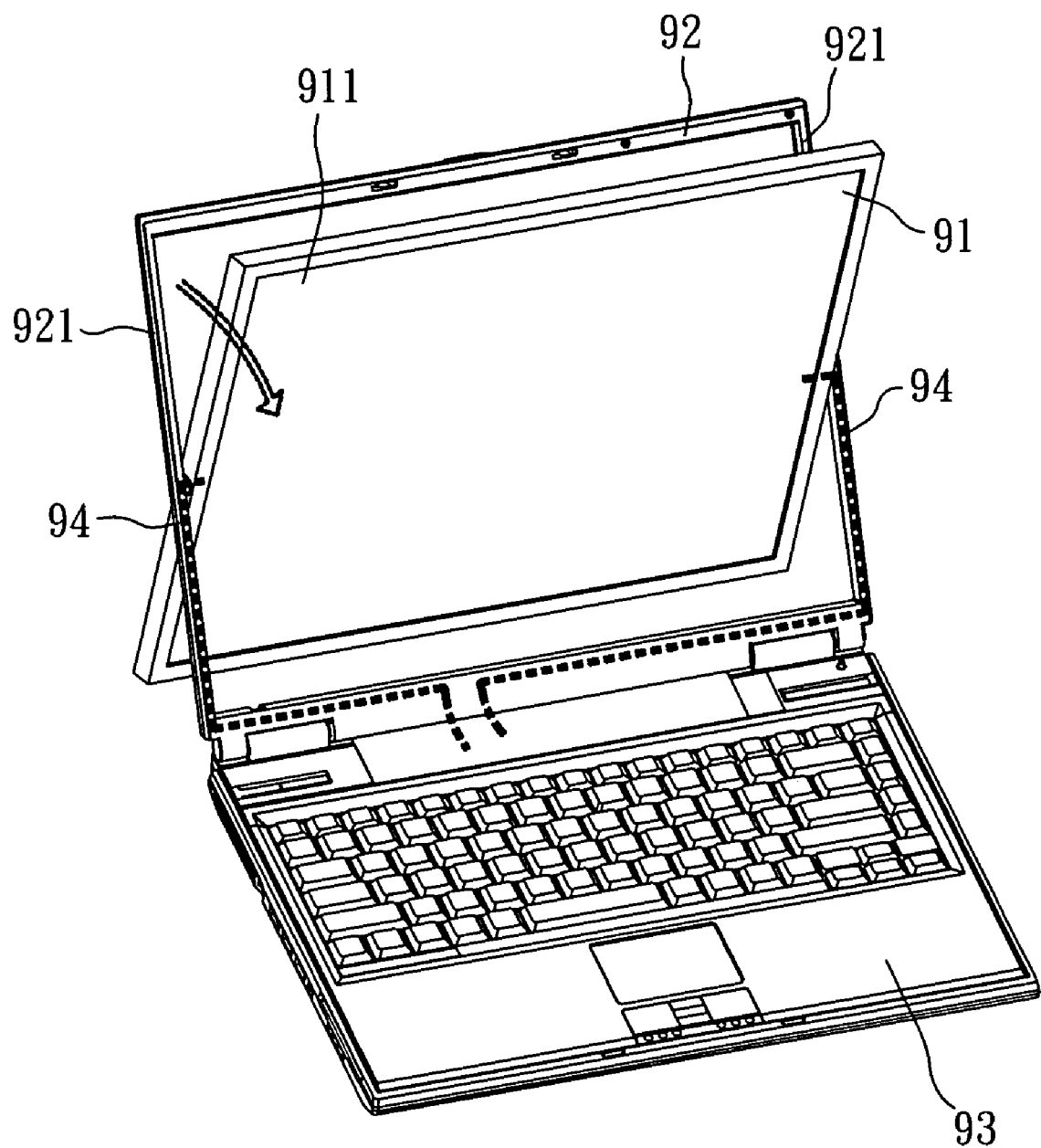
FIG. 1 is a perspective of dual-usage portable computer constructed according to the prior art.
Figure 2:
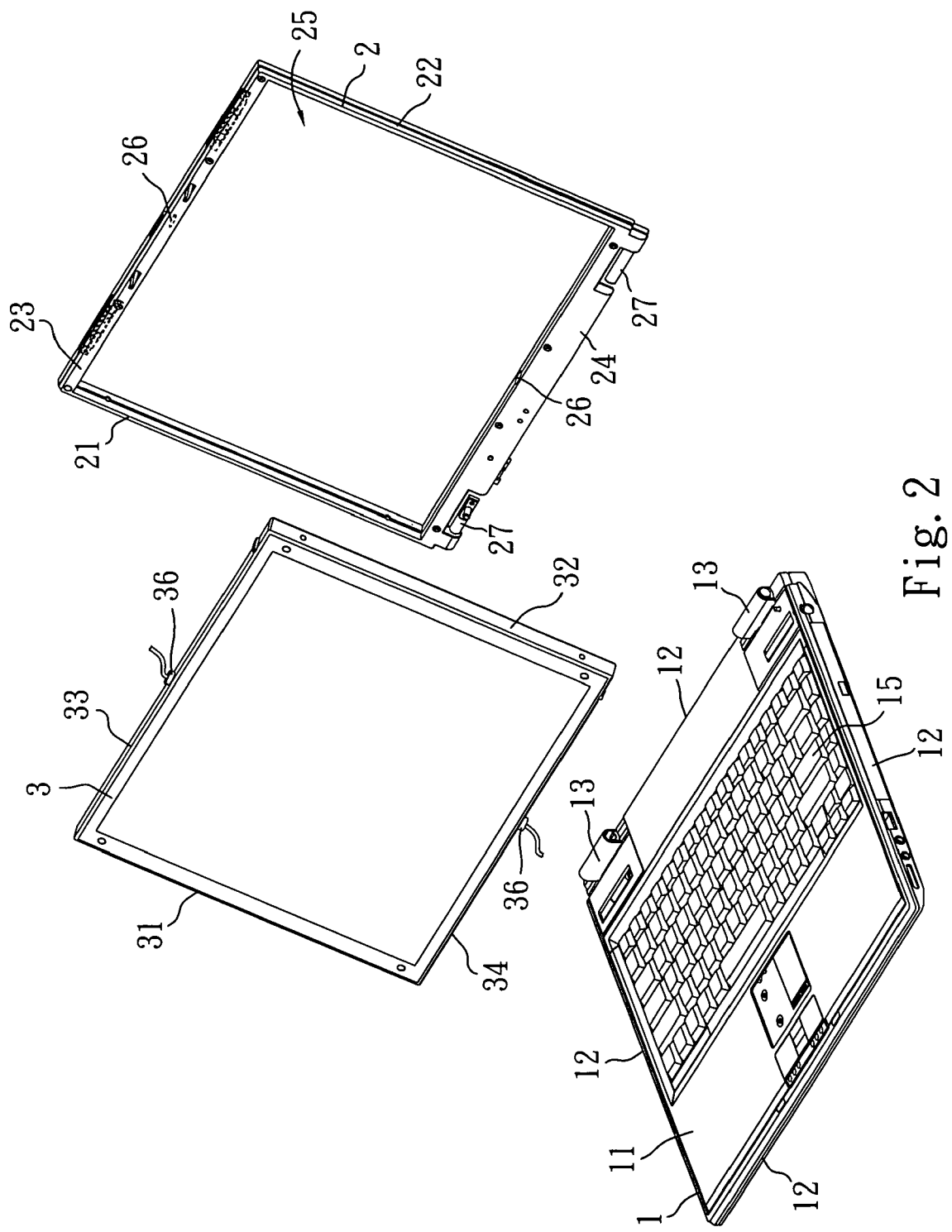
FIG. 2 is an exploded view of the preferred embodiment of the present invention.

Referring to FIG. 2, a rotatable display mounting arrangement is shown comprising a base 1, an open frame 2, and a display 3. The base 1 has a top face 11, four upright peripheral walls 12, and a first pivot structure 13 disposed at the top side of one of the upright peripheral wall 12. According to this embodiment, the first pivot structure 13 is a female pivot structure comprised of a plurality of pivot holes aligned in a line. Further, a keyboard 15 is mounted on the top face 11 of the base 1.

The open frame 2 comprises a left-side frame bar 21, a right-side frame bar 22, a top frame bar 23, and a bottom frame bar 24. The frame bars 21~24 define a mounting space 25. The open frame 2 further comprises a second pivoting means 26 symmetrically disposed on the middle position of each of the top and bottom frame bars 23 and 24, and a second pivot structure 27 disposed at the outer (bottom) side of the bottom frame bar 24. According to this embodiment, the second pivoting means 26 is a female pivoting means comprised of two pivot holes disposed on the middle position of each of the top and bottom frame bars 23 and 24 and axially aligned in line, and the second pivot structure 27 is a male pivot structure comprised of a plurality of pivot rods respectively pivotally connectable to the pivot holes of the first pivot structure 13 of the base 1. After pivoting of the second pivot structure 27 of the open frame 2 to the first pivot structure 13 of the base 1, the open frame 2 can be rotated about the axis passing through the first pivot structure 13 relative to the base 1 and closed on the top face 11 of the base 1.

As illustrated, the display 3 is mounted within the mounting space 25 inside the open frame 1, and can be moved with the open frame 2 and closed on the top face 11 of the base 1. The display 3 has a left side 31, a right side 32, a top side 33, and a bottom side 34. The four sides 31~34 correspond to the frame bars 21~24 of the open frame 2 respectively. The display 3 further comprises a first pivoting means 36 symmetrically disposed on the middle position of each of the top and bottom sides 33 and 34. According to this embodiment, the first pivoting means 36 is a male pivoting means comprised of two pivot rods respectively disposed on the middle position of each of the top and bottom sides 33 and 34 are axially aligned in line and respectively pivotally connected to the pivot holes of the second pivoting means 26 of the open frame 2 for enabling the display 3 to be rotated about an axis passing through the pivot holes of the second pivoting means 26 within the mounting space 25 of the open frame 2.

Figure 3:
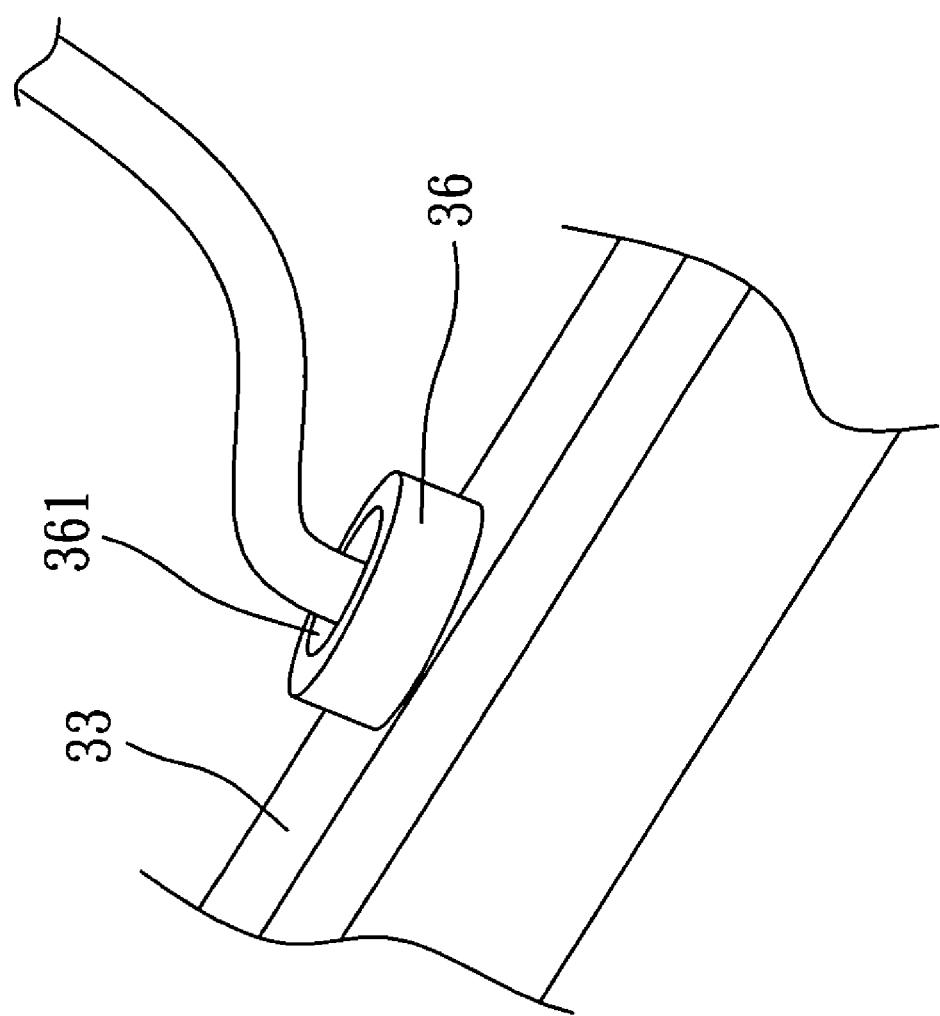
FIG. 3 is an enlarged view of a part of the display, showing the arrangement of the first pivoting means.
Figure 4:
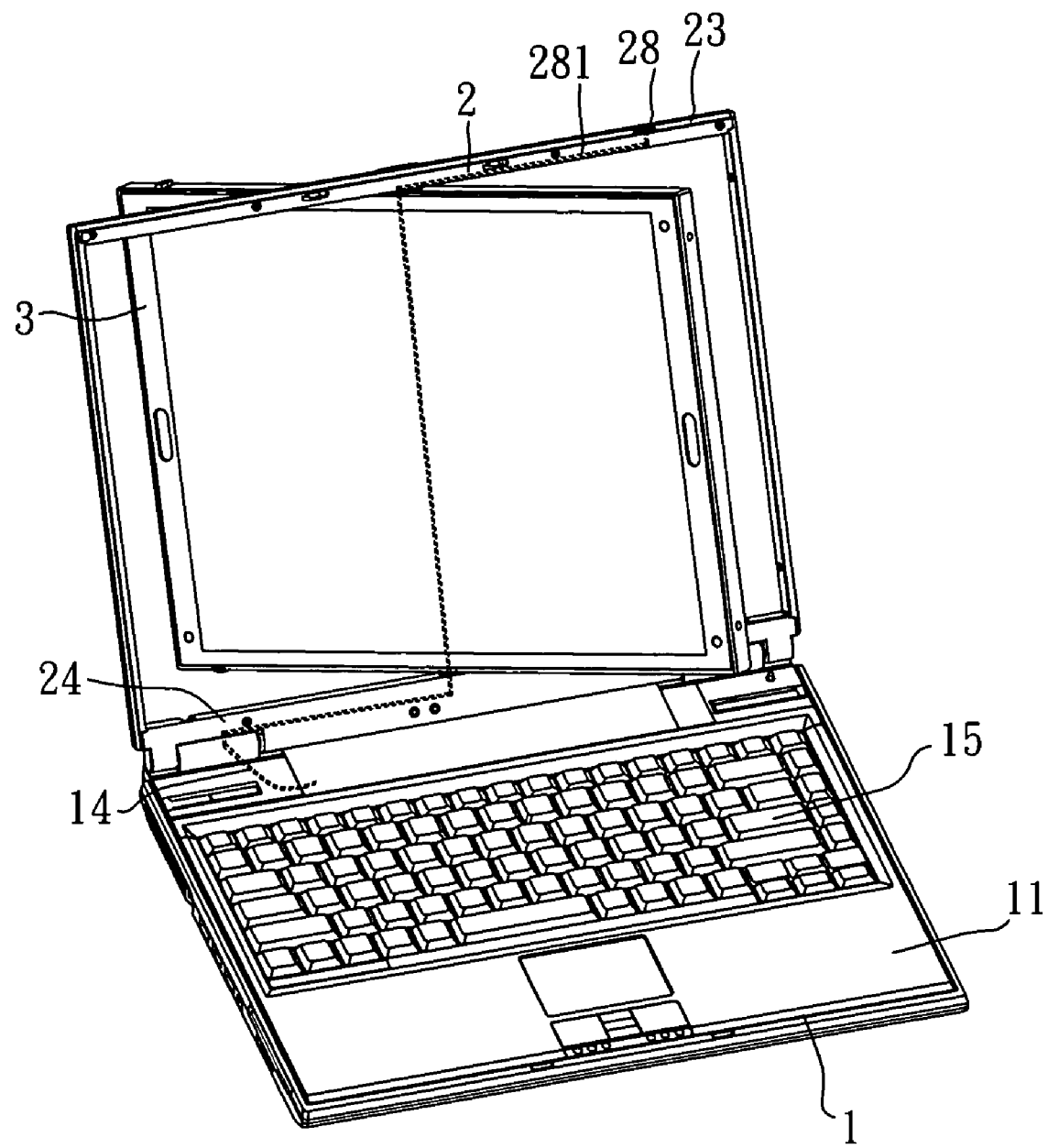
FIG. 4 is a perspective assembly view of the present invention.

Referring to FIGS. 3 and 4 and FIG. 2 again, the pivot rods of the first pivoting means 36 are tubular each defining an axially extended wire hole 361.

Further, the top frame bar 23 of the open frame 2 has an antenna 28 embedded therein. The electric wire 281 of the antenna 28 extends through the wire hole 361 of one pivot rod of the first pivoting means 36 and connected to the internal circuit of the display 3. The base 1 has an electric wire 14 extends into the inside of the bottom frame bar 24 and then inserted through the wire hole 361 of the other pivot rod of the first pivoting means 36 and then connected to the internal circuit of the display 3. Therefore, the electric wire 281 of the embedded antenna 28 and the electric wire 14 of the base 1 can be respectively inserted through the wire holes 361 of the first pivoting means 36 and then electrically connected to the internal circuit of the display 3 without passing through the left-side and right-side frame bars 21 and 22 of the open frame 2.

As indicated above, the pivot rods of the first pivoting means 36 are respectively disposed at the top and bottom sides 33 and 34 of the display 3, and the pivot holes of the second pivoting means 26 are respectively provided at the top and bottom frame bars 23 and 24 of the open frame 2 and adapted to pivot with the pivot rods of the first pivoting means 36 for enabling the display 3 to be rotated left and right and supported within the open frame 2. Therefore, the top and bottom frame bars 23 and 24 of the open frame 2 support the weight of the display 2, and the display 2 simply gives a downward pressure to the open frame 2 without causing a twisting force to the left-side and right-side frame bars 21 and 22 of the open frame 2. Therefore, this design improves the structural strength of the open frame 2. Further, because the electric wires 281 and 14 do not pass through the left-side and right-side frame bars 21 and 22 of the open frame 2, the left-side and right-side frame bars 21 and 22 of the open frame 2 can be made in a solid structure to enhance the structural strength of the whole open frame 2.

The first pivot structure 13 and the second pivot structure 27 may be exchanged, i.e., the first pivot structure 13 is made to have a plurality of pivot rods, and the second pivot structure 27 is made to have a plurality of pivot holes adapted to pivot with the pivot rods of the first pivot structure 13. Similarly, the first pivoting means 36 and the second pivoting means 26 may be exchanged.

Figure 5:
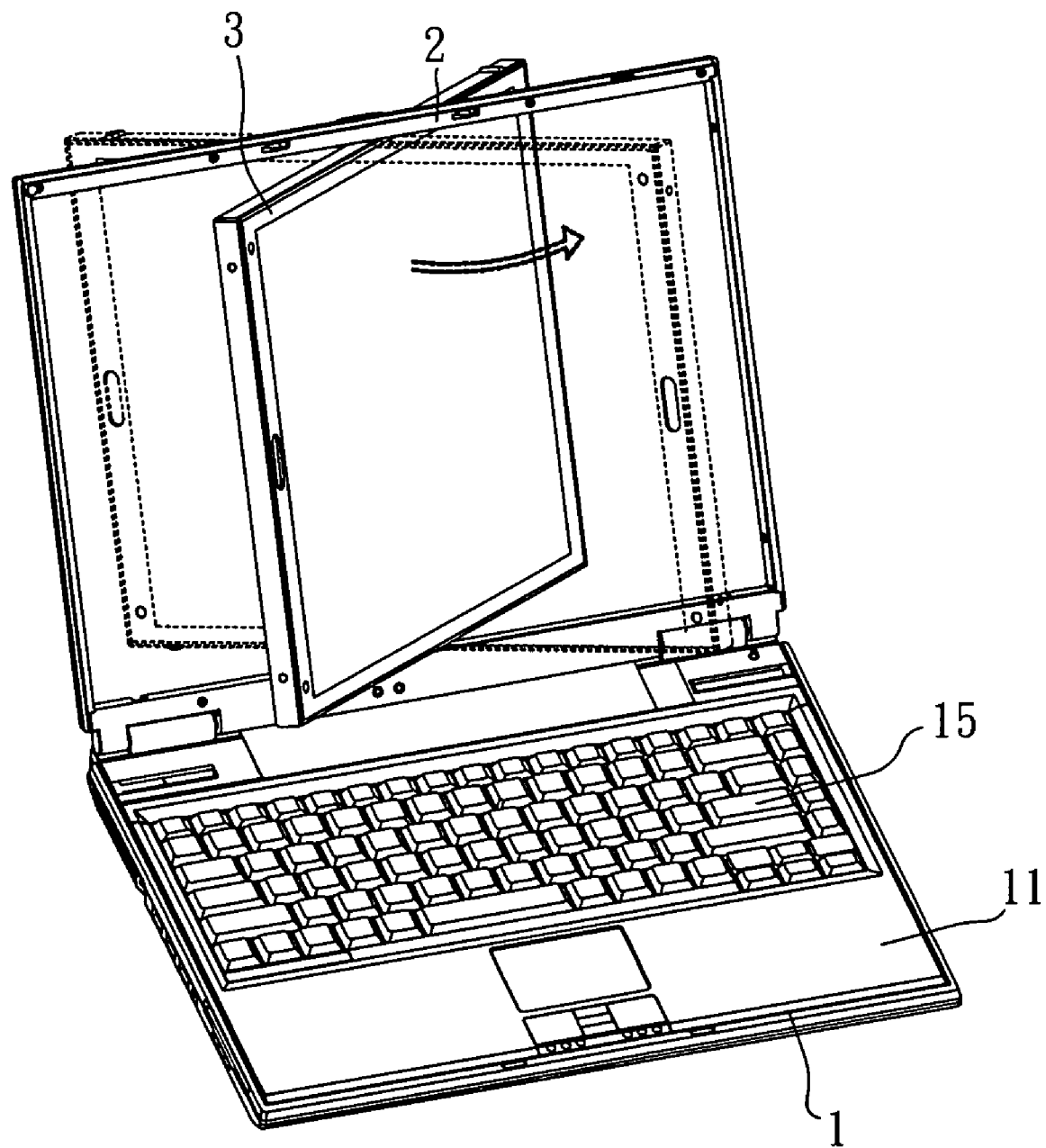
FIG. 5 is a schematic drawing showing the display rotated within the open frame according to the present invention.
Figure 6:
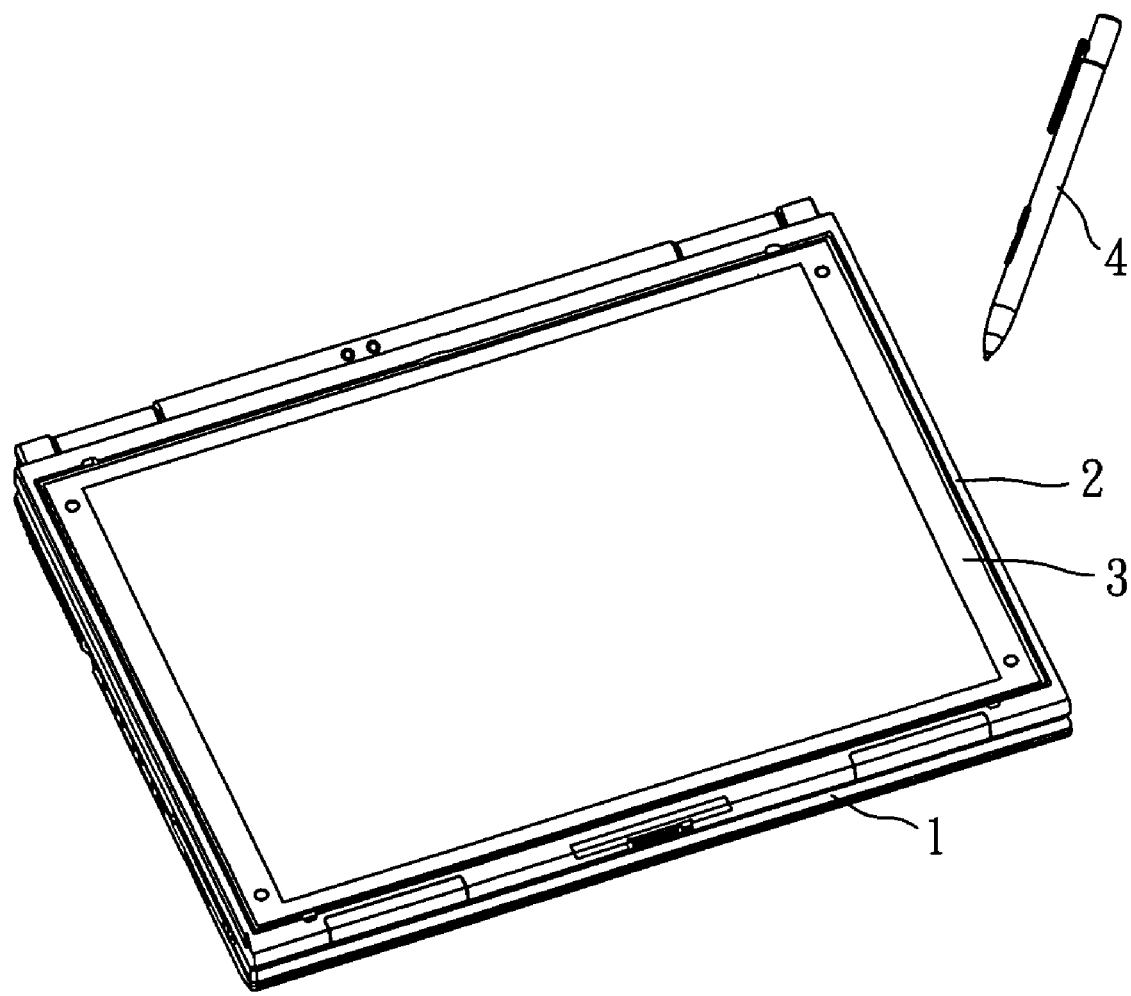
FIG. 6 is a schematic drawing showing the portable computer used as a tablet PC according to the present invention.

FIGS. 4 and 5 are schematic drawings showing rotary motion of the display within the open frame. FIG. 6 shows the portable computer used as a tablet PC. As shown in FIG. 4, when the display 3 rotated upwards with the open frame 2 from the top face 11 of the base 1, the portable computer is used as a notebook computer, and the user can use the keyboard 15 of the base 1 for data input. When rotated the display horizontally subject to the direction of the arrow shown in FIG. 5 and then closed with the open frame 2 on the top face 11 of the base 1, the portable computer is used as a table PC, and a digital induction pen 4 is used for input. Therefore, the portable computer can alternatively be used in two ways.

A prototype of rotatable display mounting arrangement has been constructed with the features of FIGS. 1~6. The rotatable display mounting arrangement functions smoothly to provide all of the features discussed earlier.

Although a particular embodiment of the present invention has been described in detail for purposes of illustration, various modifications and enhancements may be made without departing from the spirit and scope of the invention. Accordingly, the invention is not to be limited except as by the appended claims.

What is claimed is:

1. A rotatable display mounting arrangement comprising:
   a base, said base comprising a top face, four upright peripheral walls, and a first pivot structure disposed at a top side of one of said upright peripheral walls;
   an open frame, said open frame comprising a solid left-side frame bar, a solid right-side frame bar, a top frame bar, a bottom frame bar, a mounting space surrounded by said left-side frame bar, said right-side frame bar, said top frame bar and said bottom frame bar, a second pivot structure disposed at an outer side of said bottom frame bar and pivoted to said first pivot structure for enabling said open frame to be rotated relative to said base and closed on the top face of said base, and a second pivoting means symmetrically disposed on the middle position of each of said top frame bar and said bottom frame bar; and a display rotatably mounted within said mounting space inside said open frame, said display comprising a left side, a right side, a top side and a bottom side respectively disposed corresponding to the left-side frame bar, right-side frame bar, top frame bar and bottom frame bar of said open frame, and a first pivoting means symmetrically disposed on the middle position of each of said top side and said bottom side and pivoted to said second pivoting means for enabling said display to be rotated left and right within the mounting space of said open frame;

wherein one of said first pivoting means and said second pivoting means is comprised of two axially aligned pivot holes and the other of said first pivoting means and said second pivoting means is comprised of two axially aligned pivot rods respectively pivoted to said pivot holes, said pivot rods being tubular each defining an axially extended wire hole.

2. The rotatable display mounting arrangement as claimed in claim 1, wherein the top frame bar of said open frame has an embedded antenna, said embedded antenna having an electric wire inserted through a wire hole in one of said pivot rods and electrically connected to said display.

3. The rotatable display mounting arrangement as claimed in claim 1, wherein said base comprises an electric wire extended through a wire hole in one of said pivot rods and electrically connected to said display.

4. The rotatable display mounting arrangement as claimed in claim 1, wherein said base comprises a keyboard mounted on said top face.

5. The rotatable display mounting arrangement as claimed in claim 1, wherein said second pivoting means of said open frame is comprised of two pivot holes respectively disposed at the top frame bar and bottom frame bar of said open frame on the middle position, and said first pivoting means of said display is comprised of two pivot rods respectively disposed at the top side and bottom side of said display on the middle position and respectively pivoted to said pivot holes.

6. The rotatable display mounting arrangement as claimed in claim 1, wherein said first pivot structure of said base is comprised of a plurality of pivot holes axially aligned in a line, and said second pivot structure of said open frame is comprised of a plurality of pivot rods respectively pivoted to the pivot holes of said first pivot structure.

* * * * *